United States Patent
Margolin et al.

(10) Patent No.: US 7,717,625 B2
(45) Date of Patent: May 18, 2010

(54) HIGH DENSITY FIBER OPTIC INTERCONNECT SYSTEM WITH PUSH-RELEASE MECHANISM AND METHOD FOR USING SAME

(75) Inventors: Mark Margolin, Highland Park, IL (US); Gregory Bunin, Lake Zurich, IL (US)

(73) Assignee: Illum Technologies, Inc., Northbrook, IL (US)

( * ) Notice: Subject to any disclaimer, the term of this patent is extended or adjusted under 35 U.S.C. 154(b) by 0 days.

(21) Appl. No.: 11/837,997

(22) Filed: Aug. 13, 2007

(65) Prior Publication Data

US 2009/0046981 A1    Feb. 19, 2009

(51) Int. Cl.
*G02B 6/38* (2006.01)
*G02B 6/36* (2006.01)
*G02B 6/40* (2006.01)
*G02B 6/44* (2006.01)
*G02B 6/00* (2006.01)

(52) U.S. Cl. .............. 385/71; 385/53; 385/54; 385/55; 385/56; 385/57; 385/58; 385/59; 385/60; 385/62; 385/70; 385/72; 385/75; 385/76; 385/78; 385/100; 385/139

(58) Field of Classification Search .......... 385/53–60, 385/62, 70, 75, 76, 78, 100, 139, 71, 72
See application file for complete search history.

(56) References Cited

U.S. PATENT DOCUMENTS

| | | |
|---|---|---|
| 4,026,624 A | 5/1977 | Boag |
| 4,361,375 A | 11/1982 | Bailey et al. |
| 4,726,647 A | 2/1988 | Kakii et al. |
| 4,900,263 A | 2/1990 | Manassero et al. |
| 5,004,431 A | 4/1991 | Previato et al. |
| 5,082,344 A | 1/1992 | Mulholland et al. |
| 5,214,730 A | 5/1993 | Nagasawa et al. |

(Continued)

FOREIGN PATENT DOCUMENTS

JP    63-025605 A    2/1988

(Continued)

OTHER PUBLICATIONS

"MU Type Fiber Optic Connectors, HMU Series," HRS Hirose Connectors. http://www.hirose-connectors.com/products/HMU_5.htm. No date available.*

(Continued)

*Primary Examiner*—Brian M. Healy
*Assistant Examiner*—Hung Lam
(74) *Attorney, Agent, or Firm*—Patzik, Frank & Samotny Ltd.

(57) ABSTRACT

An optical fiber interconnect system wherein the adapter is connected to and released from the holder and the connector is connected to and released from adapter through two push-release connection and release mechanisms. The connector is engaged with the adapter by applying an insertion force to the connector. The connector is released by applying a releasing force to the connection mechanism on the adapter. The system of the invention includes a holder for attachment of the adapter to a front panel. A release opening is provided on the holder for the release of the adapter from the holder from the front of the panel so as to provide access to the back connector.

14 Claims, 12 Drawing Sheets

U.S. PATENT DOCUMENTS

| | | | |
|---|---|---|---|
| 5,317,663 A | 5/1994 | Beard et al. |
| 5,418,875 A | 5/1995 | Nakano et al. |
| 5,588,079 A | 12/1996 | Tanabe et al. |
| 5,734,778 A | 3/1998 | Loughlin et al. |
| 5,774,612 A | 6/1998 | Belenkiy et al. |
| 5,838,856 A | 11/1998 | Lee |
| 5,926,596 A | 7/1999 | Edwards et al. |
| 6,076,973 A | 6/2000 | Lu |
| 6,200,040 B1 | 3/2001 | Edwards et al. |
| 6,238,278 B1 | 5/2001 | Haftman |
| 6,247,850 B1 | 6/2001 | Edwards et al. |
| 6,290,527 B1 | 9/2001 | Takaya et al. |
| 6,368,140 B2 * | 4/2002 | Torii ............................ 439/352 |
| 6,386,898 B1 * | 5/2002 | Taguchi ....................... 439/352 |
| 6,409,393 B1 | 6/2002 | Grois et al. |
| 6,422,759 B1 | 7/2002 | Kevern |
| 6,457,878 B2 | 10/2002 | Edwards et al. |
| 6,505,976 B1 | 1/2003 | Grois et al. |
| D476,624 S | 7/2003 | Watanabe et al. |
| 6,634,796 B2 | 10/2003 | de Jong et al. |
| 6,695,489 B2 | 2/2004 | Nault |
| 6,702,479 B2 | 3/2004 | Yang |
| 6,814,499 B2 | 11/2004 | Finona |
| 6,823,109 B2 | 11/2004 | Sasaki et al. |
| 6,886,990 B2 | 5/2005 | Taira et al. |
| 6,918,704 B2 | 7/2005 | Marrs et al. |
| 6,934,450 B2 | 8/2005 | Hiramatsu |
| 7,008,117 B2 | 3/2006 | Kiani et al. |
| 7,036,993 B2 | 5/2006 | Luther et al. |
| 7,234,875 B2 | 6/2007 | Krowiak et al. |
| 7,261,472 B2 | 8/2007 | Suzuki et al. |
| 7,284,912 B2 | 10/2007 | Suzuki et al. |
| 2004/0121643 A1 * | 6/2004 | Roth et al. ................... 439/352 |
| 2005/0281509 A1 | 12/2005 | Cox et al. |
| 2005/0286833 A1 | 12/2005 | Kramer et al. |
| 2006/0067527 A1 | 3/2006 | Crews et al. |
| 2006/0153503 A1 | 7/2006 | Suzuki et al. |
| 2006/0153504 A1 * | 7/2006 | Suzuki et al. .................. 385/71 |
| 2006/0280408 A1 | 12/2006 | Anderson et al. |

OTHER PUBLICATIONS

Research at Photonics Laboratories (4-5); MU-type Angled-PC Connector, Copyright 2004 Nippon Telegraph and Telephone Corporation, 1 page.

HMU Series: MU Type Fiber Optics Connectors, 20 pages.

WIPO, International Search Report dated Apr. 28, 2009 for corresponding PCT application No. PCT/US2008/072916.

\* cited by examiner

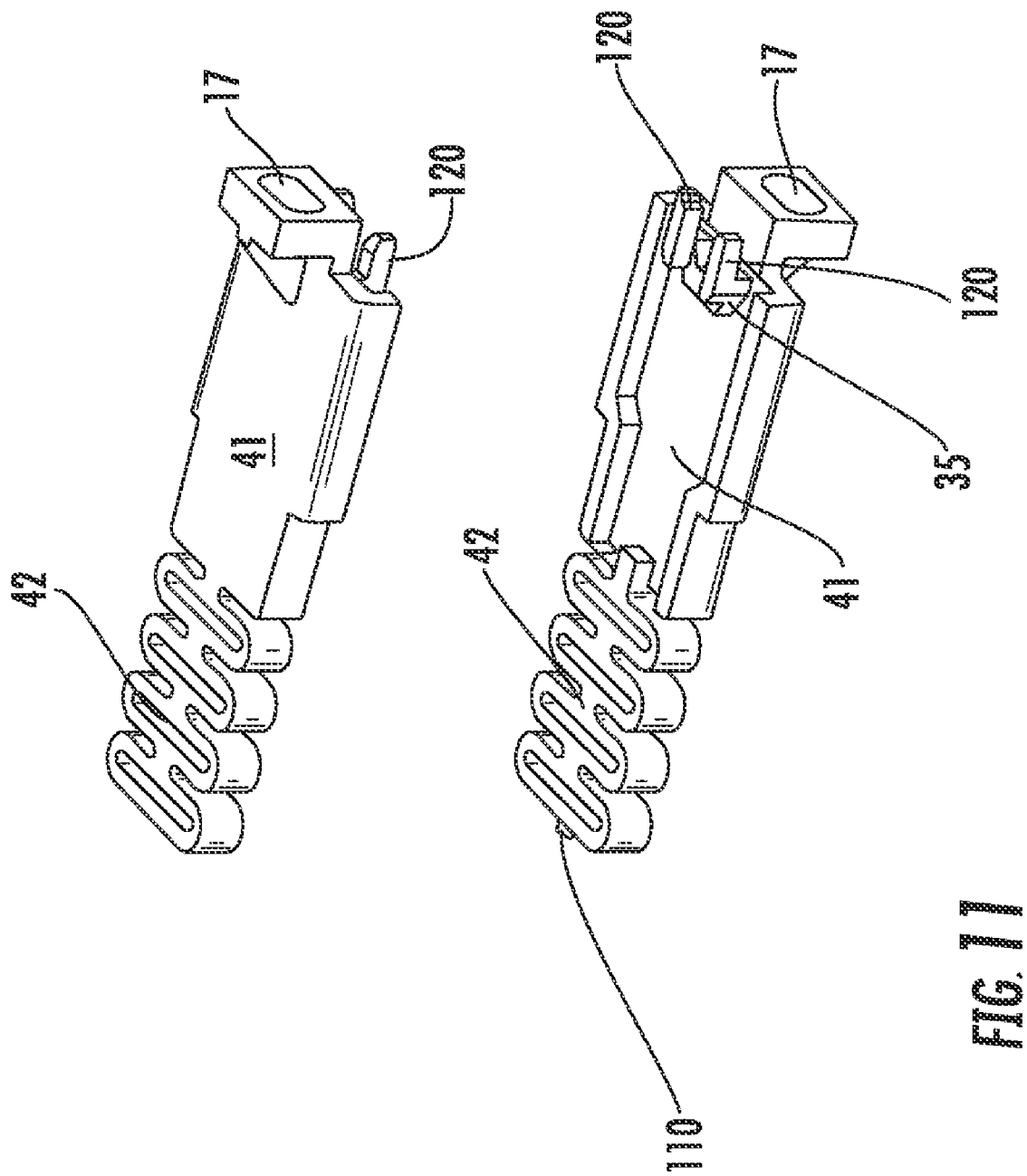

HIGH DENSITY FIBER OPTIC INTERCONNECT SYSTEM WITH PUSH-RELEASE MECHANISM AND METHOD FOR USING SAME

FIELD OF THE INVENTION

This invention generally relates to connecting fiber optic connectors to an adapter for precise end to end mating of fiber optic cables and particularly, to a high density system for interconnecting fiber optic connectors, through the use of a "push-release" insertion/withdrawal mechanism associated with an adapter for use in a high density environment and a method for using same.

BACKGROUND OF THE INVENTION

Optical fibers are used for high speed communications and data transmission. Optical fiber connectors are used to provide means for quickly coupling and uncoupling the ends of the fibers in a quick-release fashion. Optical fiber connectors are interconnected by adapters which not only interconnect a pair of opposing optical fiber connectors, but also align the optical fibers to prevent transmission losses at the interconnecting interface.

In the fiber optics field, the need frequently arises to transfer light from one fiber to another either permanently or temporarily. Optical connector plugs or connectors are one of the solutions used for this purpose. Fibers terminated with optical connector plugs can be coupled together and disconnected when necessary, either to end the connection or to route the light to a different fiber. Optical connector plugs can be of the single or multiple fiber variety. Single fiber connector plugs (simplex connector plugs) provide the connection of only one fiber to another single fiber. In multiple fiber connector plugs, several fibers are simultaneously coupled with another set of similar fibers. The invention here disclosed applies primarily to multi-fiber applications.

Traditionally, in multi-fiber connectors, the connection is achieved by the use of MT-type ferrules. The ferrules, which may be manufactured mostly from plastic, have a number of channels of a diameter slightly larger than the optical fiber. It is appreciated that the ferrules may be manufactured from materials other than plastic including, but not limited to ceramics, metal and glass and not depart from the scope of the present invention. In use, the optical fibers are inserted into the channels and maintained fixed therein by the use of adhesives such as, but not limited to, epoxy, or mechanical clamping. The ends of the fibers are preferably made to be flush or protrude slightly from the end surfaces of the ferrule and are then terminated, generally by a polishing procedure or other means that provides a very smooth surface of optical quality.

Two connectors may be mated using an adapter. Each connector preferably comprises the ferrule and a ferrule holder. One of the two mated connectors usually has a ferrule with a pair of alignment pins, while the other connector has a ferrule with a pair of alignment holes. Modern fiber optic connectors usually have a spring mechanism that pushes the ferrules towards one another with a controlled force in order to achieve physical contact of both of the ferrules' ends, thereby improving the optical performance of the connection.

Keeping fiber optic connector plugs free from contaminants such as dirt or dust is very important. Dirt or dust on fiber ends can scatter or absorb light, causing excessive loss of signal and corresponding poor system performance. Presence of contaminants inside the connector plug could cause axial misalignment with similar consequences. Likewise, because of the intensity of the light being transferred, it is important to shelter users from unintended viewing thereof, so as to prevent eye injury.

There is also a continuously increasing demand for higher density interconnect systems in fiber optics applications. The introduction by the present invention of a multi-fiber connector with the standard MT type ferrule has resulted in a small multi-fiber connector/adapter system with a push-release mechanism that allows for very high density configurations.

The push-release interconnect system of this invention is so small that it cannot be operated by using the user's fingers when used in crowded panels. Instead, a stylus-like object, like the end of a paper clip or end of a ball point can be used. While the examples described herein shown are based on an MT-type ferrule, the push-release mechanism of the present invention includes and can be used with single channel systems with ceramic ferrules as well as for duplex and multichannel designs. It can likewise be used in single, duplex and custom configurations. The present invention is directed to providing a unique optical fiber interconnect system including a push-release mechanism associated with the adapter and connector.

SUMMARY OF THE INVENTION

The interconnect system of the present invention comprises an adapter, a connector and a holder. The holder mounts the adapter to a front panel. A push-release system is provided to connect and release the connector from the adapter. The connector is coupled to the adapter by providing an insertion force to the push tab on the connector. The connector is released from the adapter by applying a releasing force to the releaser of the adapter.

A push-release system is used to release the connector from the adapter and a similar system is used to release the adapter from the holder.

A release mechanism is provided for actuating release of the adapter from the holder through the holder aperture on the front side of the holder, so as to be recessed from the front face of the panel to avoid undesired or accidental separation of the adapter from the holder. A simple plastic or metal part can be used as a tool to release the adapter from the holder. In that way, the adapter carrying a back connector can be removed from the front of the panel for cleaning, inspection, testing etc. of the back connector and adapter itself.

The alignment pin holder of the present invention is configured so that the pins can be installed after full termination and assembly of the connector from the front. In that way, the decision to use a male or female configuration could be made as late as possible in the process or even in the field.

The push-release interconnect system of the present invention enables a high density interconnect system that is more reliable, simpler, less expensive, and uses less parts, than prior art systems.

A preferred embodiment of the fiber optic interconnect system comprises: a fiber optic connector; an adapter for operably receiving said connector; and, a push-release coupling mechanism operably associated with the adapter for detachably retaining the connector in operably connected fashion within the adapter until a force is applied to the adapter to release the connector from the adapter.

At least one connector is provided for carrying one or more optical fibers along a longitudinal axis. An adapter is configured to operably connect with the connector. The adapter includes a coupling mechanism configured to receive and couple with the connector upon application of an insertion force to the connector so as to removably receive the connector in operably connected fashion in the adapter. The coupling mechanism uncouples the connector from the adapter upon application of a releasing force to the adapter for withdrawal of the connector from the adapter.

At least one connector for carrying one or more optical fibers along a longitudinal axis is provided. An adapter is configured to operably receive the connector and has a coupling mechanism operably attached thereto for detachably coupling the connector to the adapter. The connector is coupled to the adapter by applying an insertion force to the connector, so as to detachably couple the connector to the adapter. The connector is released from the adapter by applying a releasing force to the adapter, so as to release the connector from the adapter. The system further includes: a holder operably receiving the adapter and operably connecting to the panel. The holder further includes a second coupling mechanism interposed between the holder and the adapter. The holder further comprises an aperture for actuation of the coupling mechanism for releasing the adapter from the holder.

A connector is provided for carrying at least one fiber optic cable. An adapter is configured to operably and releasably connect with the connector. A holder is operably and releasably connected to the adapter. A first push-release connection mechanism is operably interposed between the connector and the adapter for releasing the connector from the adapter. A second push-release connection mechanism is interposed between the adapter and the holder for releasing the adapter from the holder.

At least one multi-position holder is connected to a panel and operably receives a plurality of adapters therein. At least one of the adapters has a release tab operably attached thereto. At least one connector has a cable attached to one end thereof and is attached to one of the plurality of adapters. The adapters are arranged substantially horizontally; and, the release tab is not blocked by the cable.

An adapter is provided for operably receiving a front connector on a front side of the panel and a back connector on a back side of the panel. A holder operably attaches the adapter to the panel. A push-release removal mechanism is operably associated with the holder and the adapter for separating the adapter from the holder from the front side of the panel. The removal mechanism enables access to the back side of the panel and the back connector from the front side of the panel.

An adapter is provided for mounting to a holder for operable attachment to a panel having front and back sides. A second or back connector is operably connected to the adapter on the back side of the panel. A push-release removal mechanism is operably interposed between the adapter and the holder for releasing the adapter from the holder. The adapter and the back connector are removed from the front side of the panel when the adapter is released from the holder.

A connector has a ferrule requiring finishing of a face thereof and having at least one aperture in the ferrule for receipt of at least one alignment pin after assembly thereof. The pin has a chamfer thereon. A pinholder is operably connected to the ferrule. The pinholder has an inner chamfer corresponding to the outer chamfer on the pin for interlocking receipt thereof. The pinholder also has a stop wall to stop the alignment pin in the desired position.

The invention further includes a method of connecting and releasing an adapter having a release tab and a connector having a push tab of a fiber optic interconnect system. An insertion force is applied to the push tab of the connector towards the adapter until received by the adapter. The connector is engaged with the adapter in an operable fashion. A releasing force is applied to the release tab of the adapter to release the connector from the adapter.

In the method of connecting and releasing an adapter from a holder, the holder has a release opening. An insertion force is applied to the adapter towards the holder until it is received by the holder. The adapter is engaged with the holder in an operable fashion. A removing force is applied to a recessed release mechanism through the release opening to release the adapter from the holder.

The invention further includes a connector for carrying at least one fiber optic cable and containing a resilient member operably associated therewith. An adapter is configured to operably and releasably connect with the connector. The resilient member, which can be a compression spring, a piece of rubber or the like, is compressed when the adapter connects with the connector and expands and generates a spring force when the connector is released from the adapter and the resilient member, expands. A push-release connection mechanism is operably interposed between the connector and the adapter for releasing the connector from the adapter. The resilient member force serves to push the connector away from the adapter when the connector is released from the adapter.

Other objects, features and advantages of the invention will become apparent from the following description taken in connection with the accompanying drawings.

BRIEF DESCRIPTION OF THE DRAWINGS

The design of the system can be better understood by following the description of the drawings set forth herein. A brief description of each figure is included here.

FIG. 11 contains perspective views of the top and bottom of the releaser.

Figure 1:
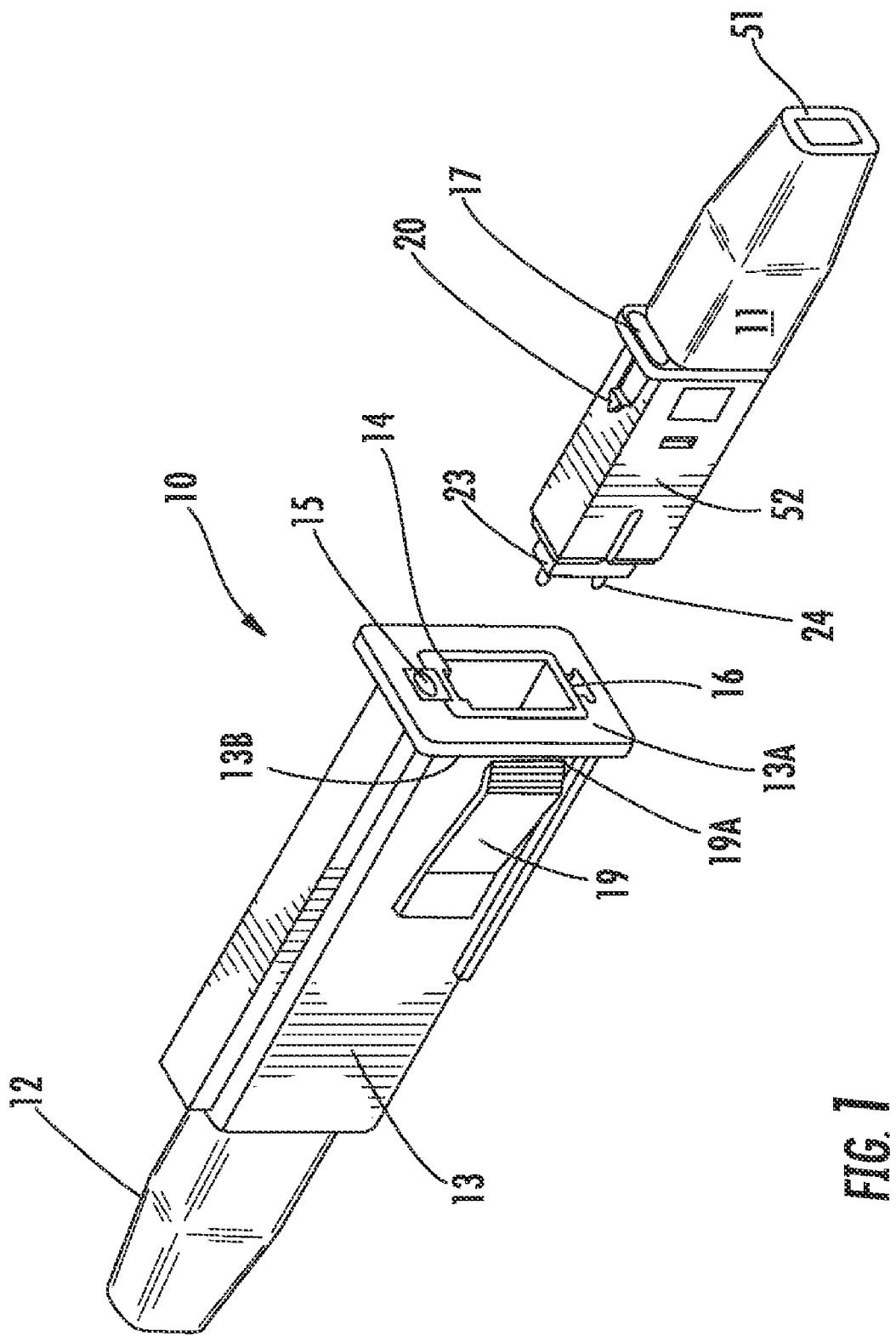
FIG. 1 is a perspective view of the Push-Release interconnect system showing rear connector 12 connected to adapter 14 within holder 13 and front connector 11 not connected to adapter 14.

While the invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

DETAILED DESCRIPTION OF THE DRAWINGS

Figure 2:
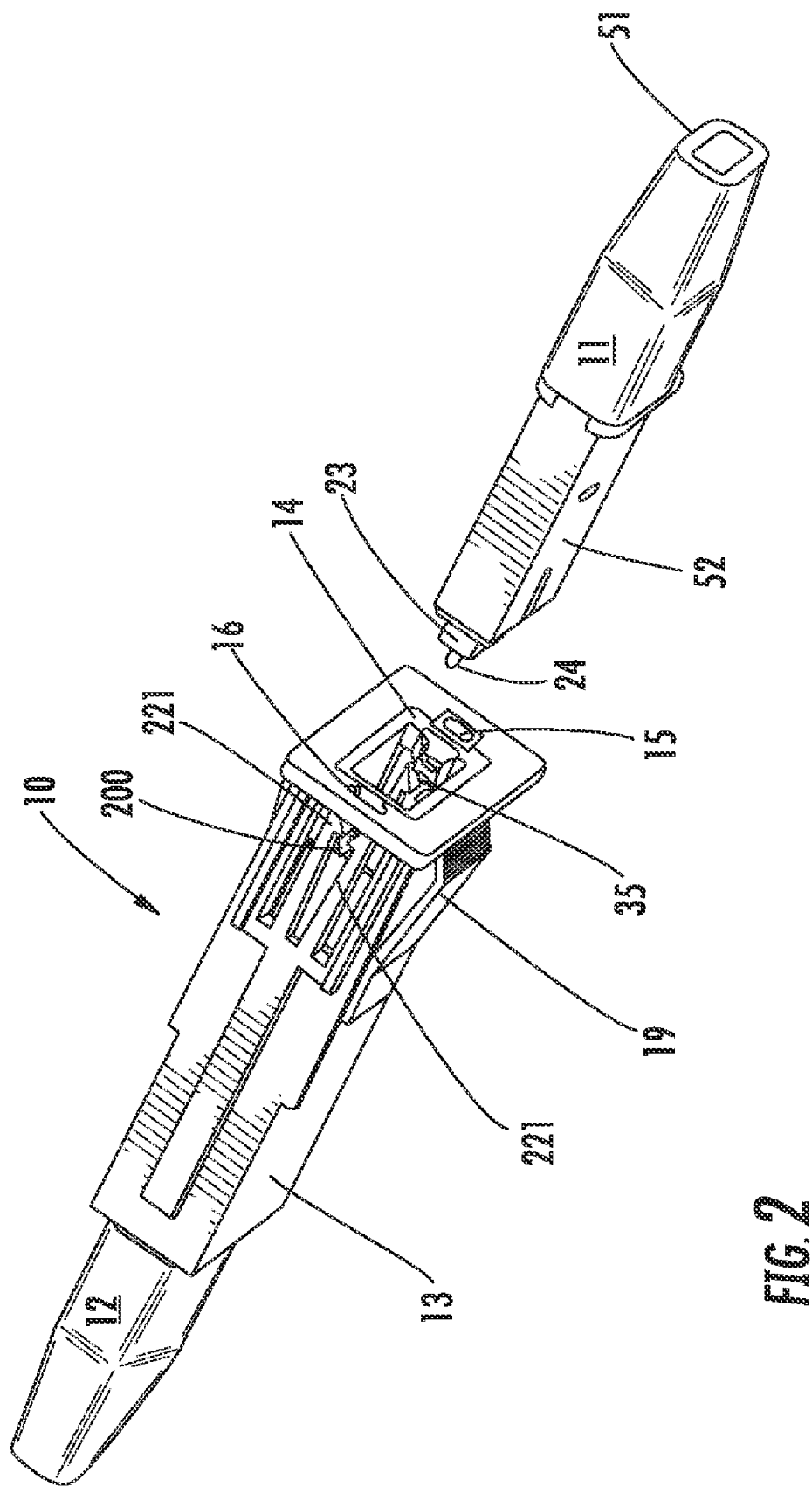
FIG. 2 is a perspective view of the Push-Release interconnect system of FIG. 1 showing the bottom thereof.

Referring to the drawings in greater detail, and first to FIGS. 1 and 2, the interconnect system 10 of the present invention includes adapter 14, connectors 11 and 12 and holder 13 and uses a push-release mechanism. The adapter 14 is mounted inside the interior of holder 13, while the holder 13 is mounted on the panel 30 (shown in FIG. 3). The connector 11 can be pushed into the adapter 14 by using any stylus-like, pointed object (not shown) such as a special tool, ball pen point, end of a paper clip or the like to apply a pushing force (away from the user) to push tab 17. In the configuration of FIGS. 1 and 2, connector 11 is the front connector and connector 12 is the rear connector. Holder 13 is a one position holder.

Conversely, the connector 11 can be released from the adapter 14 by using the same sort of stylus-like object. A pushing force is applied to releasing tab 15. so as to release the connector 11 from the adapter 14.

Figure 3:
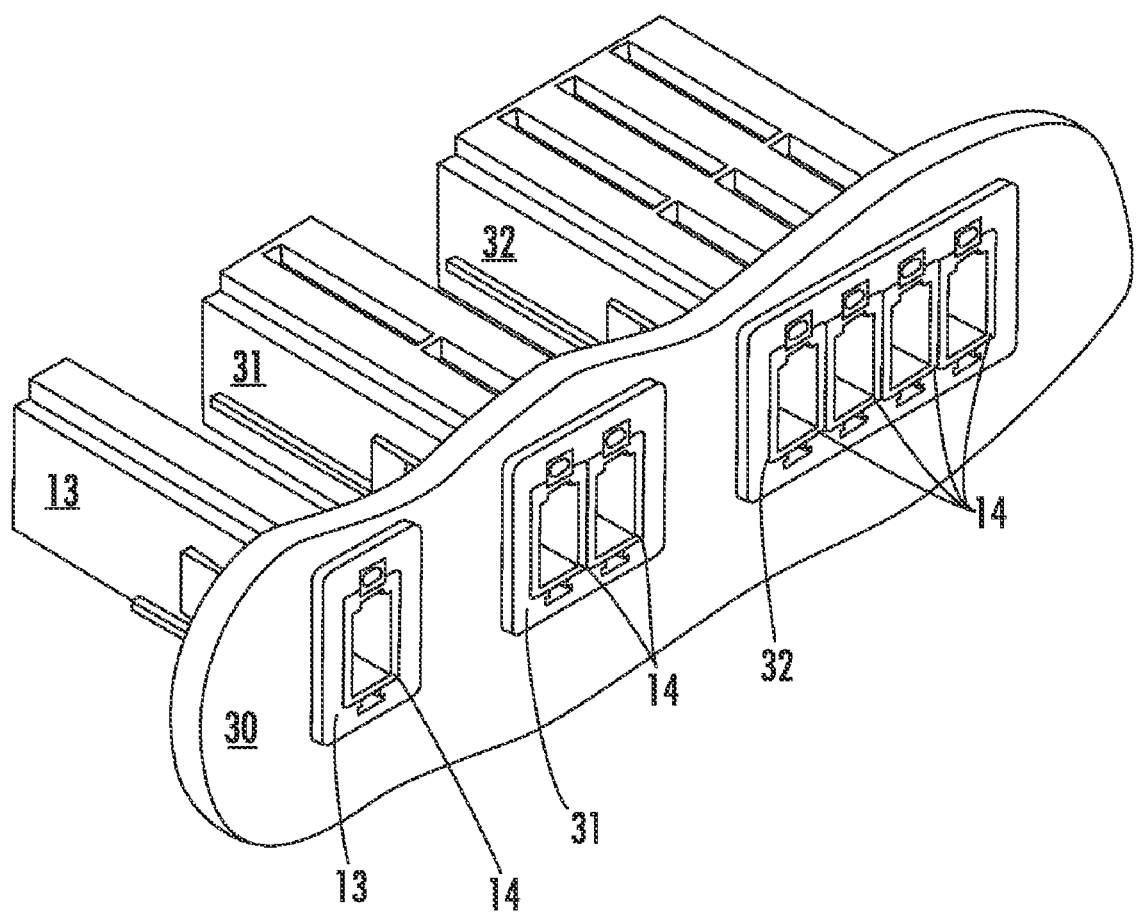
FIG. 3 is a perspective view of one position, two position and four position holders containing adapters and attached to a front panel.

Latches 19 on the sides of the holder 13 are designed to be operable with almost all standard panel 30 thicknesses. Panel 30 of FIG. 3 is held between step-like front edge 19A of latch 19 and the back edge 13B of holder flange 13A. As shown, the series of steps on front end 19A of latches 19 enable the use of holder 13 with panels 30 of different standard thicknesses.

The adapter 14 can be pushed into the holder 13 by inserting a connector 11 into adapter 14 or with the aid of a stylus-like special tool, miniature screwdriver, ball pen point or paper clip (not shown) by pushing on connector tab 17. The adapter 14 can be released from the holder 13 by using a simple tool to push on latches 221 recessed inside holder release opening 16.

Because the adapter 14 together with the rear connector 12 can be released from the holder 13 (toward the user) from the front as shown in FIGS. 1 and 2, through use of the stylus-like object, there is no need to open the chassis for cleaning the adapter 14 or rear connector 12.

FIG. 2 shows an inverted view of holder 13 having dual prong latch 221 that receive stopper 200 of adapter 14 so as to hold adapter 14 in place therebetween in releasable fashion. Inserting the simple tool such as slightly modified miniature screwdriver or the like, into release opening 16 enables separation of the prongs of latch 221 so that stopper 200 can move between opened prongs 221 latch 221 to result in release of the adapter 14 from the holder 13 from the front thereof.

Turning to FIG. 3, the adapter holders can have many different configurations. Depending on the panel pattern, a vertical or horizontal holder position can be more suitable. One-position 13, two-position 31 and four-position 32 holders are shown. Other holder configurations are also possible, though the adapters 14 and connectors 11, 12 used in those different configurations would always be the same.

Figure 4:
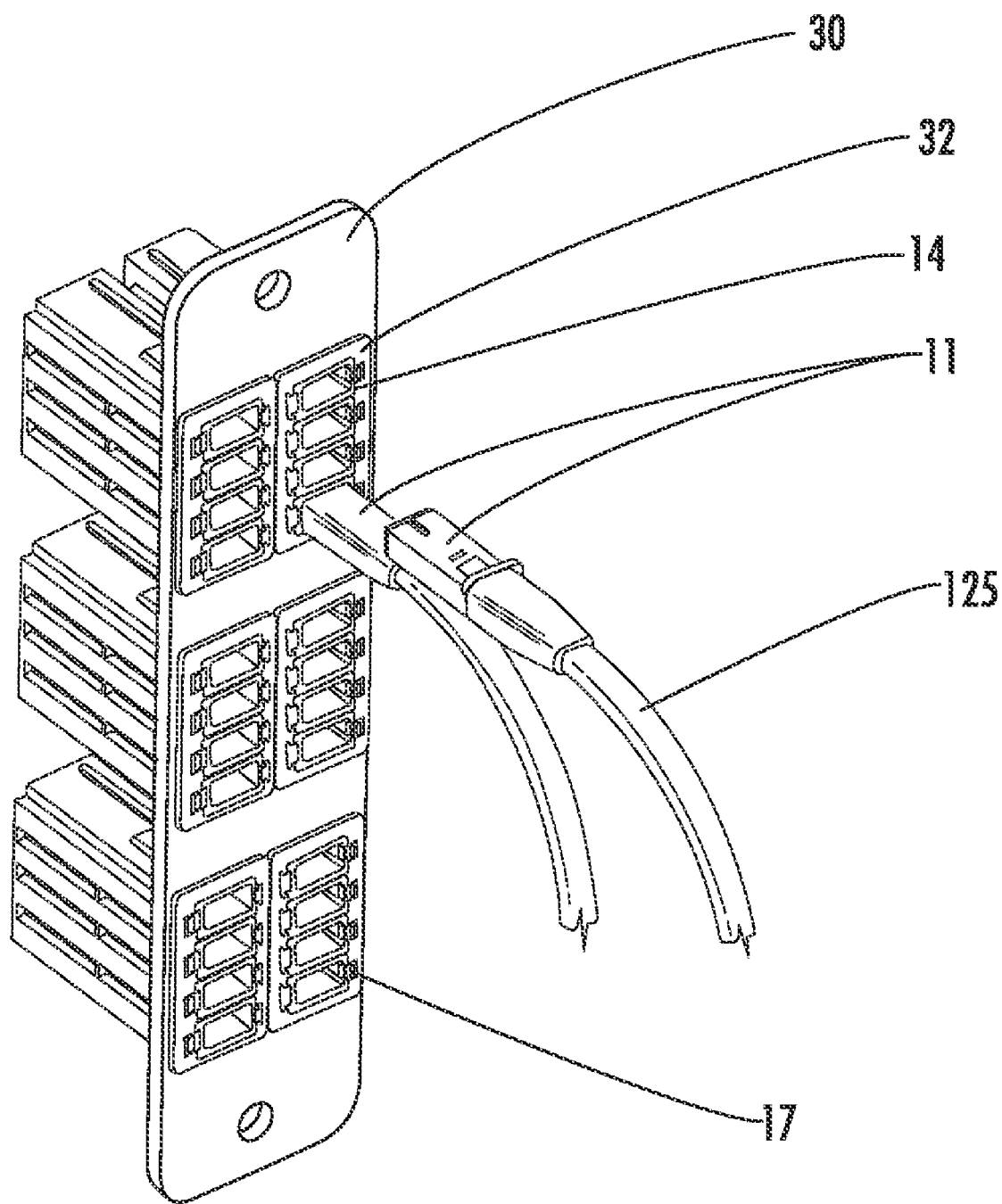
FIG. 4 is a perspective view of a multi-position panel.

FIG. 4 shows one example of a potential multi-position panel configuration of the adapters 14, connector 11 and 24-position panel 30 with four-position holders 32. In this example, holders 32 are mounted on the panel 30 in a horizontal direction so the hanging cables 125 of connectors 11 are not obstructing release tabs 17 of adapters 14.

Figure 4A:
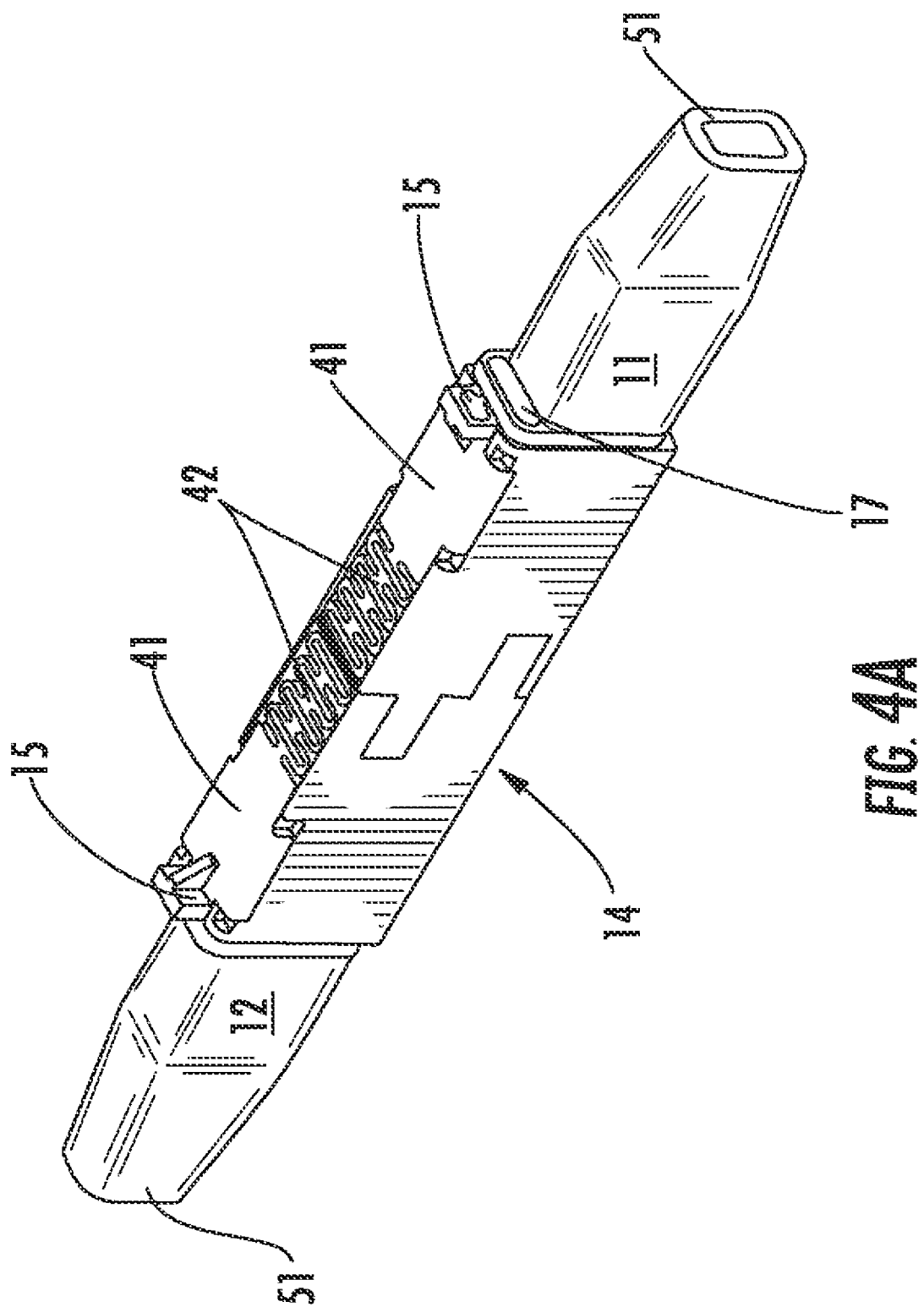
FIG. 4A is a perspective view of the interconnect system adapter subassembly with the front and rear connectors attached, but without the holder surrounding the adapter.
Figure 5:
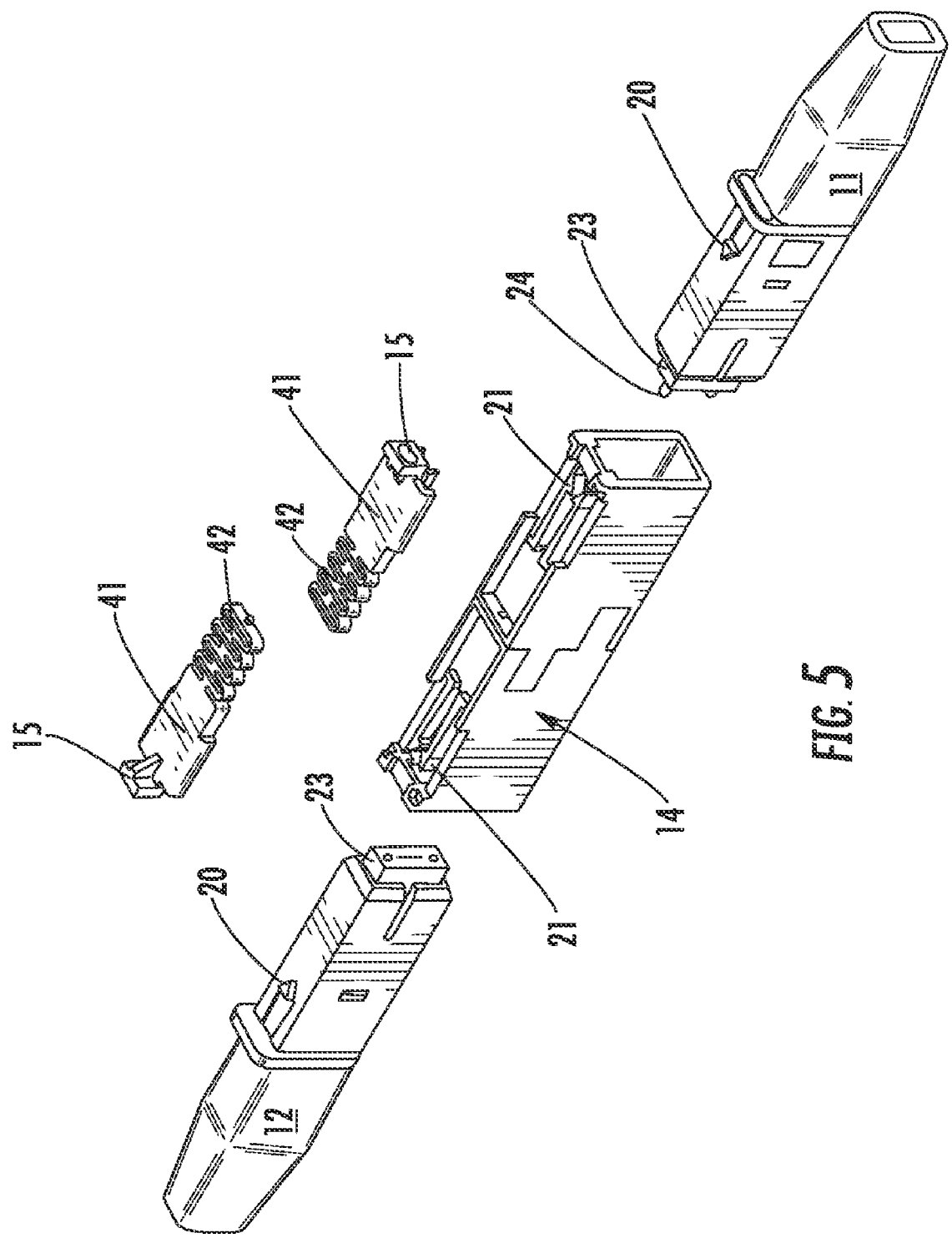
FIG. 5 is a partially exploded view of the interconnect system adapter subassembly without the holder.

The connector-adapter subassembly is shown in FIGS. 4A and 5. Front connector 11 and rear connector 12 each have boots 51, pushing tabs 17 and are shown fully inserted into adapter 14 in FIG. 4A. Releasers 41 each have resilient portions 42 that compress when release tabs 15 are pushed inward (away from the user). In order to secure the connector 11 in adapter 14, push tab 17 is pushed forward (away from user) until stopper 20 (shown in FIG. 5) moves between the prongs of latch 21 (FIG. 5), separates the prongs and is then releasably captured therebetween. Because the internal springs (not shown) of the connector 11 are slightly compressed when connector 11 is fully inserted in adapter 14, connector 11 sits securely in adapter 14 without undesired wiggling or play and the like. When rear or second connector 12 is similarly secured in adapter 14, the internal springs of both connectors 11, 12 are compressed more to provide the required mating force.

FIG. 5 is an exploded view of the interconnect system subassembly. As shown in FIG. 5 with respect to front connector 11, connectors 11, 12 each have ferrule 23 and connector 11 has pins 24.

To release connector 11, 12 from adapter 14, releasing tab 15 should be moved forward (away from the user) until the wedge underneath releaser 41 separates prongs of latch 21 and thus allows connector 11, 12 to be pushed out (toward user) from adapter 14 by the force of its internal connector springs.

Figure 6:
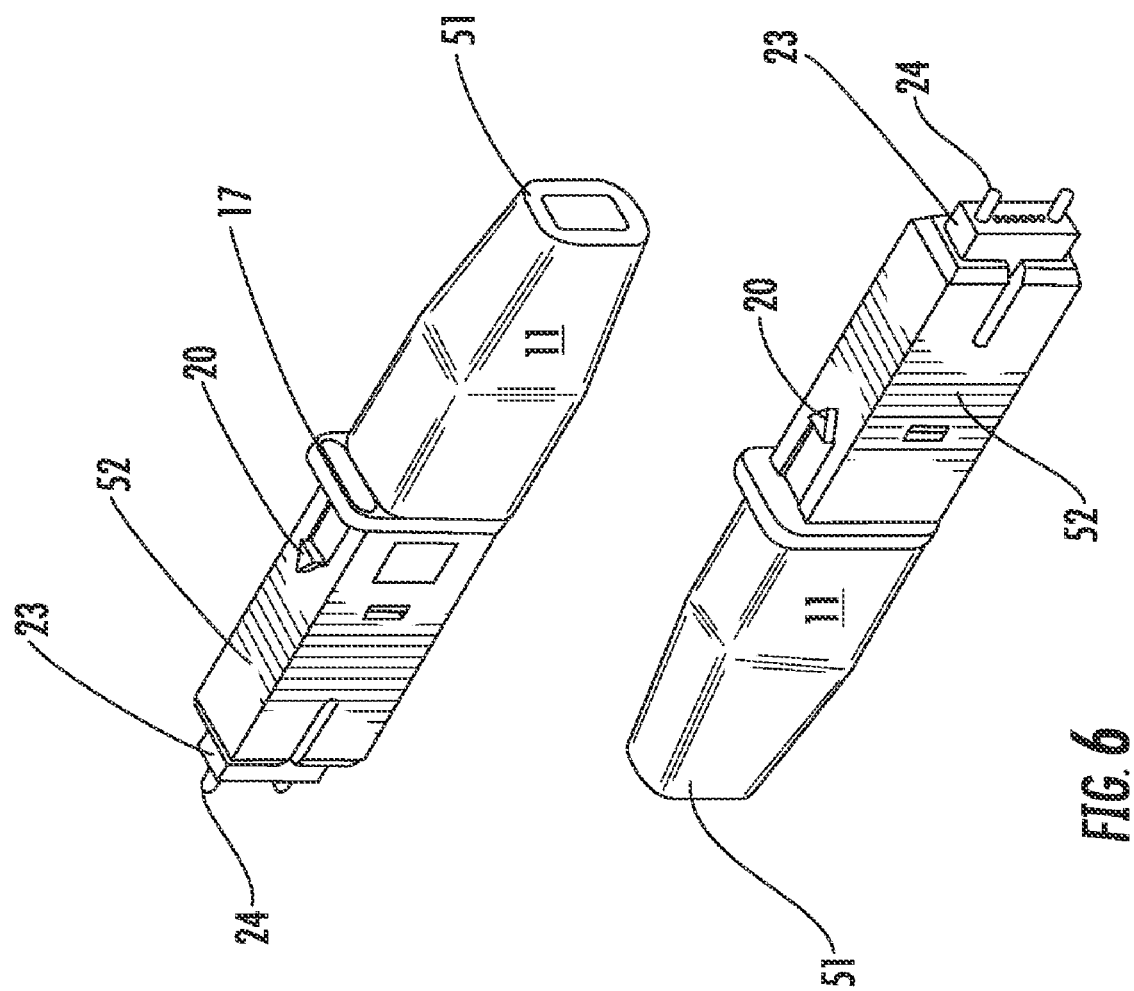
FIG. 6 provides perspective views of the male connector from the front and rear ends.

FIG. 6 focuses on connector 11 of the preferred embodiment which is shown from front and rear ends. Connector 11 is intended to be usable with standard MT type ferrule 23 and alignment pins 24, with any number of fibers. Stopper 20 of housing 52 is shown as triangular in this example, but it can be any shape that works to separate prongs of flange 21 when connector 11 is inserted into adapter 14 and reliably keep it in mating position. Stopper 20 can be molded into or otherwise affixed to housing 52. The same is true for stopper 200 on the bottom of adapter 14 (see FIG. 9).

Alignment pins 24 can be installed in ferrule 23 from the front of the ferrule 23 after assembly of the connector 11 is completed. As a result, the gender of the connector 11 can be determined at the end of the termination process or even later in the field. Accordingly, the difficulties caused by forgetting to install pins 24 in ferrule 23 prior to assembly are avoided.

Figure 7:
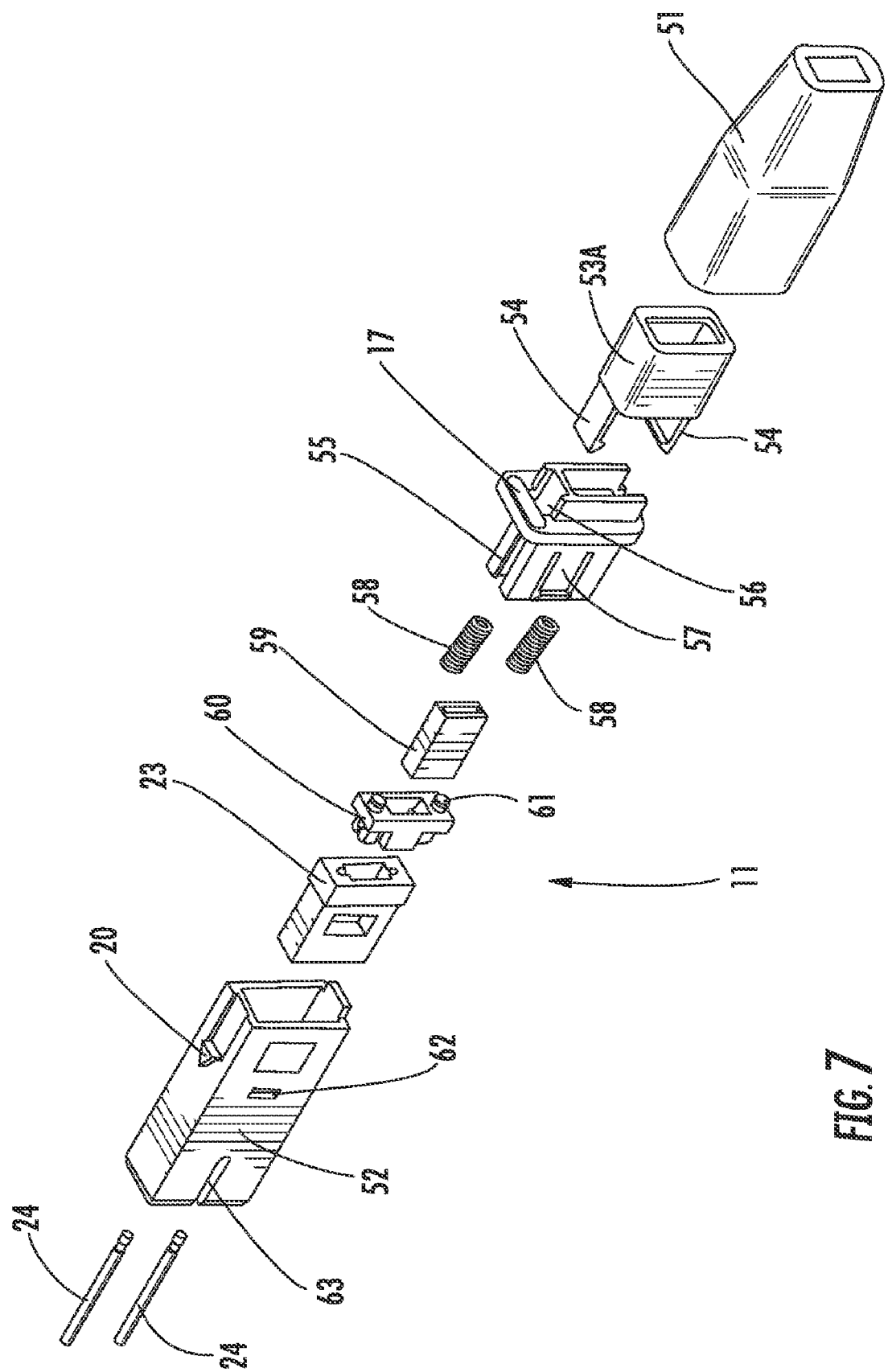
FIG. 7 is an exploded perspective view of male connector 11.

An exploded view of the connector 11, 12 of the preferred embodiment is shown in FIG. 7. If pins 24 are installed, the connector has the configuration of connector 11. In this embodiment, connector 11, 12 comprises 5 main molded parts. Housing 52, pin holder 60, rear body 55, boot housing 53A and boot 51 are shown in addition to identical compression springs 58. The assembly process comprises ferrule 23, springs 58, pin holder 60 and inner boot 59 are first placed in connector housing 52. Rear body 55 is then snapped into housing 52. Boot housing 53A is then snapped onto rear body 55. Latches 54 of boot housing engage openings 56 of rear body 55. Latches 57 of rear body 55 engage openings 62 of housing 52. Pins 24 are held by pin holder 60.

Springs 58 (shown in FIG. 7) serve to spring-load ferrule 23 within connector 11. Slots 63 of connector 11, 12 shown in FIG. 7, receive ribs 300 on the interior of the adapter 14 visible in FIG. 10. When connector 11, 12 is fully inserted into adapter 14 and interior adapter ribs 300 almost reach the end of slots 63 on the exterior of the connectors 11, 12 the interior springs 58 are compressed. When connectors 11, 12 are released from adapter 14, the spring force generated by compressed springs 58 when they are released serves to drive the connector 11, 12 away from the adapter 14.

Figure 8:
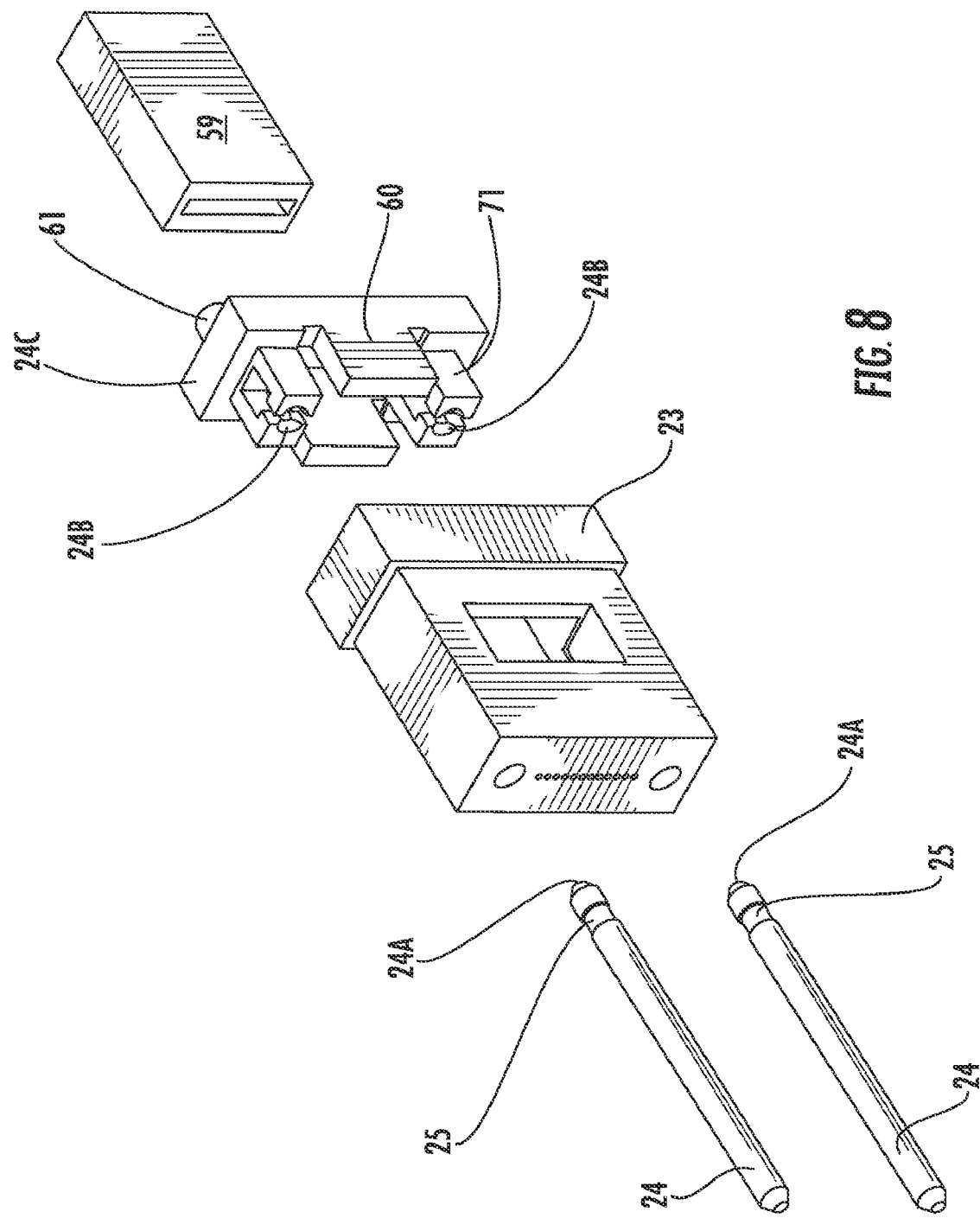
FIG. 8 is an exploded perspective view of the ferrule subassembly.

Turning to FIG. 8, pin holder 60 enables alignment pins 24 to be installed from the front, after all of the assembly steps including termination are completed. Pin holder 60 is provided with 2 sets of latches 71 which have an inner chamfer 24B in the entrance area thereof for capturing the alignment pins 24. Corresponding outer chamfers 24A on the rear ends of the pins 24 facilitates installation. Each pin 24 snaps into latches 71 and is secured therein by its grooves 25 being received by latches 71. Two bosses 61 on the opposite side of the pin holder 60 are used as fixing elements for 2 compression springs 58 of the connector 11, 12. Stop wall 24C of pin holder 60 stops alignment pins from going too far and serves to position alignment pins 24 in the desired position.

Figure 9:
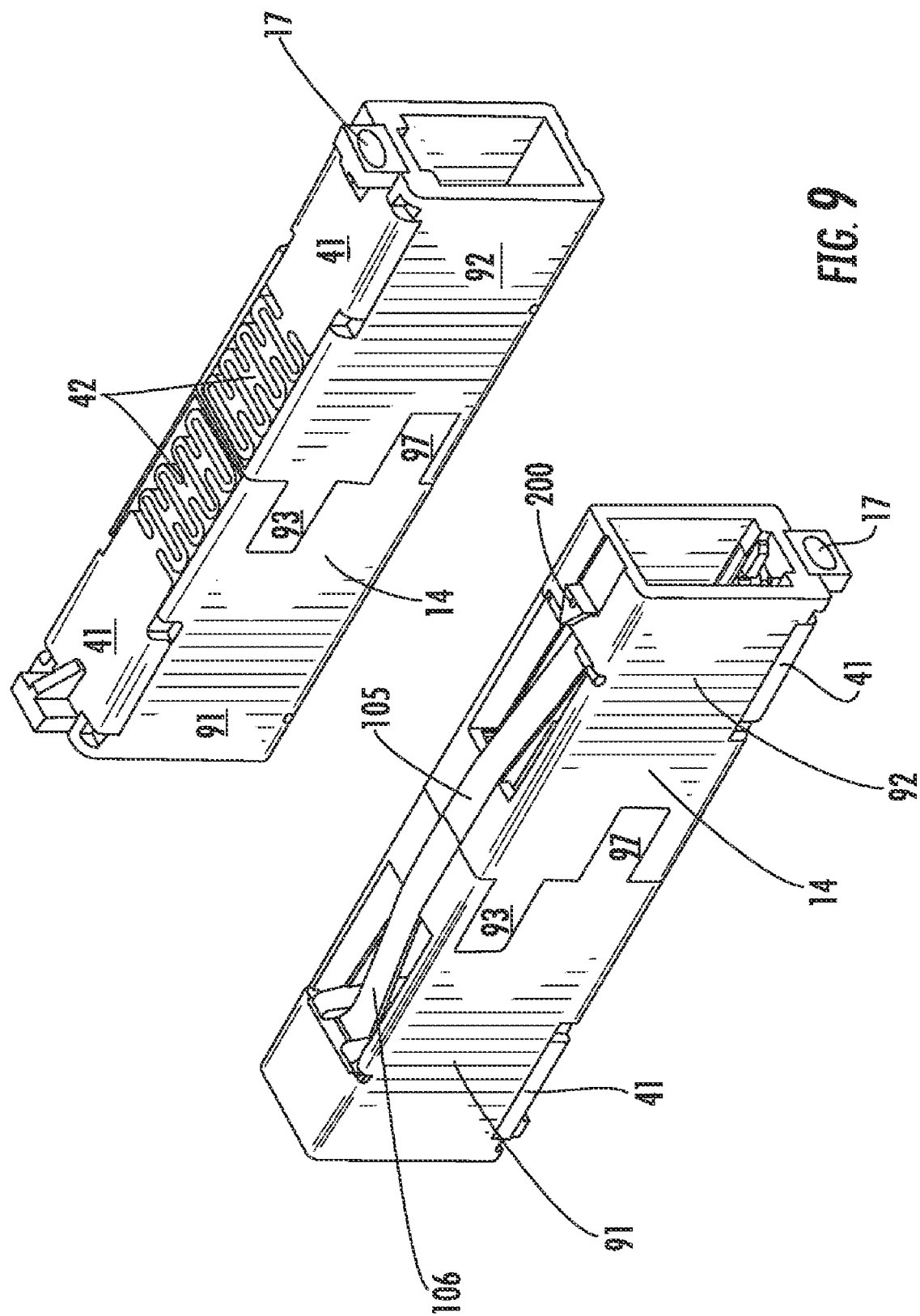
FIG. 9 contains perspective views of the top and bottom of the adapter assembly.

FIG. 9 shows top and bottom views of adapter 14. In the preferred embodiment, the housing of adapter 14 consists of 2 almost identical halves, rear housing 91 and front housing 92. Rear housing 91 and front housing 92 are held together by 2 pairs of mirror image latches, which are shown as latches 93 and 97. Alternatively, housing 91, 92 are held together by ultrasonic welding or the like. Adapter 14 includes two identical spring loaded shutters 103, 107 (shown in FIG. 10) in order to protect the user's eyes from the laser emissions and partially protect the interior of adapter 14 from dust, dirt and particles. Adapter 14 further includes releasers 41 having resilient portions 42 and release tabs 17.

Pushing release tab 17 in a direction away from the user with a stylus like object results in movement of releaser 41 and compression of resilient portion 42. Double wedge 35 on the underside of releaser 41 (shown in FIG. 11) is then driven between prongs of internal latch 131 of adapter 14. Because of its wedge shape, the prongs of internal latch 131 are separated enough so that they no longer hold stopper 20 of connector 11, 12 in captured fashion therebetween. As a result of this release and by the force of the internal springs, the connector 11, 12 is urged to slide outwardly relative to adapter 14 (towards the user).

The bottom most view of FIG. 9 is the inverted or bottom view of adapter 14. Shutter springs, which in this embodiment are leaf springs 105, 106 bias shutters 103, 107 closed unless and until a connector 11, 12 is inserted into adapter 14.

Adapter stopper 200 is provided on the bottom of the front half 92 of the adapter 14. Adapter stopper is also wedge-shaped so as to first split and separate double prongs of the latch 221 on the interior of the holder 13 (see FIG. 2) and then be releasably captured therebetween when adapter 14 is fully inserted into holder 13.

The top most view of FIG. 9 is the top view of adapter 14 showing rear housing 91 and front housing 92, front latch 92 and rear latch 97, and releasers 41.

Figure 10:
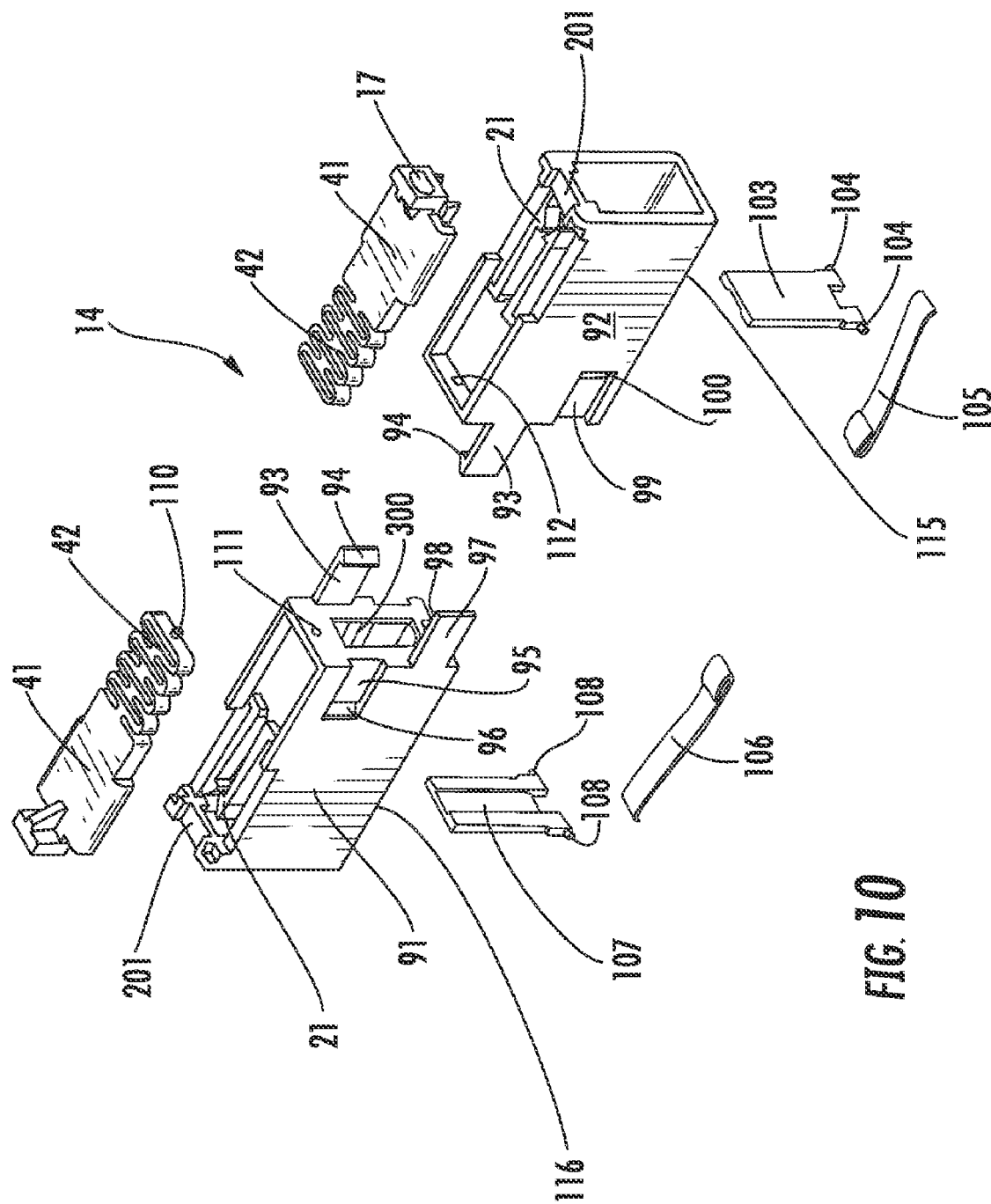
FIG. 10 is an exploded perspective view of the adapter assembly.

An exploded view of the adapter 14 assembly is provided in FIG. 10. Double prong latches 21 are provided on both halves 91, 92 of adapter 14 housing. In the preferred embodiment they are provided as a molded element of the housing itself. Releasers 41 are assembled in each housing half 91, 92 by slight compression of resilient portions 42 in the longitudinal direction, so that boss 110 goes into opening 111, 112 and the opposite side of releaser 41 is secured under the housing bridge 201 by prongs 120 (shown in FIG. 11).

Each shutter 103, 107 has two half pins 104, 108 and are secured by the half pins 104, 108 into two semicircular openings 115, 116 in housing halves 91, 92. In that way, leaf springs 105, 106 keep shutters 103, 107 in place by slight pressure. As a result, the shutters 103, 107 open upon insertion of the connector 11, 12 and close upon withdrawal of the connector 11, 12 as a result of biasing from the leaf springs 105, 106.

Housing half 91 is attached to housing half 92 by latch 97 snap fitting into opening 100, latches 93 snap fitting into opening 96 and mirror image latches on the opposite side (not shown) do likewise. While snap-fitting of latches within openings in tongue and edge-like fashion is discussed and shown herein, other acceptable forms of attaching the body halves 91 and 92 should deemed as being within the scope of the invention. A recess 99 in body half 92 corresponding to latch 97 of body half 91 is shown. Likewise a recess 95 in body half 91 corresponding to latch 93 is shown. Each latch 93, 97 has a pawl 94, 98 at its free end for receipt by openings 96, 100 in the recess 95, 99 with which it mates.

Views of releaser 41 from its top and its bottom are provided in FIG. 11. Releaser 41 has push tab 17, prongs 120 and resilient part 42. As viewed from the bottom, boss 110 is seen on the far end of releaser 41 and prongs 120 and wedge 35 are also shown.

While stopper 20 and latches 21; stopper 200 and latches 221; and wedge 35 and latches 21 are shown as triangular in shape and comprising resilient prongs, respectively, other configurations of stoppers or latches that serve to capture and retain a component in releasable fashion should be considered as being within the scope of the invention.

Many modifications and variations of the present invention are possible in light of the above teachings. It is therefore to be understood that within the scope of appended claims, the invention may be practiced other than as specifically described. Various modifications, changes and variations may be made in the arrangement, operation and details of construction of the invention disclosed herein without departing from the spirit and scope of the invention. The present disclosure is intended to exemplify and not limit the invention.

What is claimed:

1. A fiber optic interconnect system for mating two or more ferrules in face to face relation and operably connected to a panel comprising:

A fiber optic connector for carrying at least one fiber optic cable in a ferrule;

At least one connector having internal spring means serving to spring load said ferrule within said connector;

Said internal spring means having a ferrule spring for spring loading said ferrule within said connector;

Said connector operably connecting to an adapter by applying a first pushing force to the connector so as to at least partially compress said ferrule spring of said internal spring means to provide a mating force for mating said ferrules;

A push-release coupling mechanism operably associated with said adapter for detachably retaining said connector in operably connected fashion with said adapter until a second pushing force is applied to the adapter in the same direction as the first pushing force, but at a different location, to release the connector from the adapter and automatically push the connector away from the adapter by the force of the ferrule spring of said internal spring means; and A holder operably and detachably receiving said adapter and automatically connecting the holder to the adapter and in turn to the panel;

Said holder operably attached to said panel so as to remain attached to the panel, when the adapter is detached from the holder.

2. A fiber optic interconnect system for operably connecting a connector for carrying at least one fiber optic cable in a ferrule and an adapter to a panel comprising:

At least one connector for carrying one or more optical fibers along a longitudinal axis;

Said connector having internal spring means serving to spring load said ferrule within said connector;

Said internal spring means having a ferrule spring;

an adapter configured to operably connect with said connector, wherein said adapter comprises an adapter coupling mechanism interposed between said adapter and said connector and configured to receive and automatically couple with said connector upon application of an insertion force to the connector so as to removably receive the connector in operably connected fashion;

wherein said adapter coupling mechanism automatically uncouples the connector from said adapter upon application of a releasing force in the same direction as the insertion force to said adapter for withdrawal of the connector from the adapter;

said ferrule spring providing both a mating force to said connector and a force to push the connector away from the adapter when the connector is uncoupled from the adapter;

said adapter coupling mechanism comprising resilient means operably recessed within said adapter so as not to increase the size of the adapter and the connector;

a holder operably attached to said panel as well as operably and detachably receiving said adapter and operably and automatically connecting said adapter to said holder and in turn said panel, wherein said holder stays attached to said panel when said adapter is removed from said holder;

said holder further comprising a holder coupling mechanism interposed between said holder and said adapter for automatically and detachably coupling said holder to said adapter; and, said holder further comprising an aperture for actuation of said holder coupling mechanism for releasing said adapter from said holder.

3. A fiber optic interconnect system for one or more connectors comprising:

One or more connectors for carrying at least one fiber optic cable in each connector;

said connector configured to operably and releasably connect with an adapter;

said connector carrying at least one fiber optic cable terminated in a ferrule;

said connector further including a ferrule spring for spring loading said ferrule within said connector;

at least one adapter operably and releasably connected to at least one holder;

said at least one adapter having the same size and shape, regardless of the number of connectors simultaneously coupled and being configured to be operably and releasably connected with any of said holders configured for any number of adapters;

an adapter push-release connection mechanism operably interposed between said connector and said adapter for automatically uncoupling said connector from said adapter;

said ferrule spring providing both a mating force to said connector and a force to push the connector away from the adapter when the connector is uncoupled from the adapter; and, wherein a holder release connection mechanism is interposed between said adapter and said holder for releasing said adapter from said holder.

4. A fiber optic interconnect system comprising:

At least one connector for carrying at least one fiber optic cable;

said connector configured to operably and releasably connect with an adapter;

said connector carrying at least one fiber optic cable terminated in a ferrule;

said connector further including a ferrule spring for spring loading said ferrule within said connector;

said ferrule spring providing both a mating force to said connector and a force to automatically push the connector away from the adapter when the connector is uncoupled from the adapter;

At least one multi-position holder connected to a panel and operably receiving a plurality of adapters therein in detachable fashion;

Said adapters each having the same configuration for receiving at most one of said connectors at each end of the adapter;

at least one of said adapters having a spring-loaded release tab operably attached thereto;

at least one connector having a cable attached to one end thereof and attached to one of said plurality of adapters;

Said adapters being arranged substantially horizontally; and,

Said release tab not being blocked by said cable.

5. A fiber optic interconnect system for attachment to a panel having a front side and a back side within a chassis, the fiber optic interconnect system comprising:

An adapter for operably receiving a front connector on the front side of the panel and receiving a rear connector on the opposite side of the adapter on the back side of the panel;

A first connecting and removal mechanism operably associated with said adapter and comprising a push-release mechanism;

said connector configured to operably and releasably connect with said adapter;

said connector carrying at least one fiber optic cable terminated in a ferrule;

said connector further including a ferrule spring for spring loading said ferrule within said connector;

said ferrule spring providing both a mating force to said connector and a force to automatically push the connector away from the adapter when the connector is uncoupled from the adapter;

A holder operably and detachably attached to said adapter and attaching said adapter to the panel;

A second connecting and removal mechanism operably associated with said holder and said adapter for separating said adapter from said holder from the front side of said panel; and Said second connecting and removal mechanism providing access to said opposite side of the adapter and the second connector from the front side of the panel for cleaning and inspection of said opposite side of the adapter and the second connector without opening the chassis.

6. A fiber optic interconnect system comprising:

An adapter for mounting to a panel having front and back sides;

A first connecting and removal mechanism operably associated with said adapter comprising a push-release mechanism;

A holder for automatically and detachably mounting said adapter to said panel;

A connector operably connected to said adapter on the back side of the panel;

said connector being operably and releasably connected to said adapter;

said connector carrying at least one fiber optic cable terminated in a ferrule;

said connector further including a ferrule spring for spring loading said ferrule within said connector;

said ferrule spring providing both a mating force to said connector and a force to automatically push the connector away from the adapter when the connector is uncoupled from the adapter;

A second connecting and removal mechanism operably interposed between the adapter and the holder for releasing said adapter from said holder;

Said second connecting and removal mechanism comprising stopper means on said adapter and resilient latch means on said holder for detachably retaining said adapter in operably connected fashion with said holder; and, Wherein said adapter and said back connector are removed from the front side of the panel when said adapter is released from the holder.

7. A fiber optic interconnect system for configuring a connector as a male or as a female after the assembly thereof comprising:

A connector:

said connector configured to operably and releasably connect with an adapter;

said connector carrying at least one fiber optic cable terminated in a ferrule having a front side;

said connector further including a ferrule spring for spring loading said ferrule within said connector;

said ferrule spring providing both a mating force to said connector and a force to automatically push the connector away from the adapter when the connector is uncoupled from the adapter;

Said ferrule of said connector requiring finishing of a face thereof and having at least one aperture in said ferrule for receipt of at least one alignment pin from the front of said ferrule after assembly thereof;

Said pin having a chamfer thereon;

A pinholder operably adjacent to the ferrule for receipt of the pin from the front side of said ferrule;

Said pinholder having a chamfer corresponding to the chamfer on the pin for receipt thereof;

Said pinholder having a stop wall to stop the alignment pin in the desired position; and, wherein configuration of the connector as a male or as a female is delayed until after termination is completed.

8. A method for a fiber optic interconnect system of connecting and releasing a connector carrying a ferrule, from an adapter having a release tab and resilient latch means, said connector having a push tab and stopper means, the method comprising:

Spring loading the ferrule within the connector with a ferrule spring operably connected to said connector and said ferrule;

said ferrule spring providing both a mating force to said connector and a force to automatically push the connector away from the adapter when the connector is uncoupled from the adapter;

Applying an insertion force at the push tab of said connector towards said adapter until said stopper means is received by the resilient latch means of the adapter wherein said ferrule spring provides a mating force to said connector;

Engaging the stopper means of the connector with the resilient latch means of the adapter in an operable fashion; and, Applying a releasing force in the same direction as the insertion force at the release tab of said adapter to release the stopper means of the connector from the resilient latch means of the adapter wherein said ferrule spring provides a force to automatically push the connector away from the adapter when the connector is released from the adapter.

9. A method for a fiber optic interconnect system of connecting and releasing an adapter having a front connector attached at a first end of the adapter and a rear connector attached at the second end of the adapter, stopper means, from a holder attached to a panel and having a release opening and resilient latch means, the method comprising:

Applying an insertion force to said adapter towards said holder until said stopper means of the adapter is received by the resilient latch means of the holder;

Engaging the stopper means of the adapter with the resilient latch means of the holder in an operable fashion; and, Applying a removing force to a release mechanism through said release opening to release the stopper means of the adapter from the resilient latch means of the holder for removing the adapter from the holder for inspecting or cleaning the rear connector without removing the front connector from the adapter, while maintaining the holder in attached relationship to the panel.

10. A fiber optic interconnect system comprising:

a first connector for carrying at least one fiber optic cable and containing a resilient member operably associated therewith;

an adapter configured to operably and releasably connect with said first connector and mate said first connector with a second connector;

said resilient member being compressed when said adapter connects with said first connector and expanding and generating a releasing force when said first connector is released from the adapter;

said resilient member further providing a mating force when said first connector is mated to said second connector;

a first connection mechanism comprising a push-release mechanism operably interposed between said first connector and said adapter for automatically releasing said first connector from said adapter;

said releasing force serving to automatically push said first connector away from said adapter when said first connector is released from said adapter;

a holder for operably and releasably connecting with said adapter; and, a holder connection mechanism operably interposed between said adapter and said holder for releasing said adapter from said holder for cleaning or inspecting said connector without disconnecting said first connector from said adapter.

11. The fiber optic interconnect system of claim 2 further comprising:

A first location on said connector for application of said insertion force to the connector;

A second location on said adapter for application of said releasing force to said adapter; and, Wherein said insertion force and releasing forces are applied in substantially the same direction and at different locations.

12. The fiber optic interconnect system of claim 11 wherein said different locations at which said forces are applied are in close proximity to each other.

13. The fiber optic interconnect system of claim 4 wherein said releasing tab is substantially flush with the front of the adapter.

14. The fiber optic interconnect system of claim 2 wherein said resilient means includes means for uncoupling said connector from said adapter.

* * * * *